(12) United States Patent
Liu

(10) Patent No.: US 12,403,418 B2
(45) Date of Patent: Sep. 2, 2025

(54) NANOPOROUS METAL FOAM GAS AND FLUID FILTERS

(71) Applicant: Georgetown University, Washington, DC (US)

(72) Inventor: Kai Liu, Falls Church, VA (US)

(73) Assignee: Georgetown University, Washington, DC (US)

(*) Notice: Subject to any disclaimer, the term of this patent is extended or adjusted under 35 U.S.C. 154(b) by 0 days.

(21) Appl. No.: 16/582,123

(22) Filed: Sep. 25, 2019

(65) Prior Publication Data

US 2020/0086257 A1 Mar. 19, 2020

Related U.S. Application Data

(63) Continuation of application No. PCT/US2018/026343, filed on Apr. 5, 2018.
(Continued)

(51) Int. Cl.
*B01D 39/00* (2006.01)
*B01D 39/20* (2006.01)
(Continued)

(52) U.S. Cl.
CPC ......... *B01D 39/2051* (2013.01); *B01D 46/24* (2013.01); *B01D 46/60* (2022.01);
(Continued)

(58) Field of Classification Search
CPC ............... B01D 39/2051; B01D 46/00; B01D 46/0021; B01D 46/24; B01D 2239/0478; B01D 2239/1216
(Continued)

(56) References Cited

U.S. PATENT DOCUMENTS 4,731,135 A * 3/1988 Tani .............. B01D 46/10
156/181
5,428,964 A * 7/1995 Lobdell ............ G05D 27/02
340/672
(Continued)

FOREIGN PATENT DOCUMENTS

CA 2152644 1/1996
CN 102179246 A * 9/2011
(Continued)

OTHER PUBLICATIONS

ISA/KR, Korean Intellectual Property Office (KIPO), International Search Report and Written Opinion Issued Nov. 2, 2018, related PCT international applicaiton No. PCT/US2018/026343, pp. 1-14, claims searched, pp. 15-19.
(Continued)

*Primary Examiner* — T. Bennett McKenzie
(74) *Attorney, Agent, or Firm* — Smith Gambrell & Russell LLP

(57) ABSTRACT

A filtration system and method for removing sub-micron particulates and contaminants from a fluid flow with the use of ultralow density metal and coated metal foams that have nanometer to micron scale pores that can trap fluid borne particulates. Filters can use metal foams and coated metal foams alone or in tandem. The size and density of the pores in the foam can be adjusted with synthesis conditions. Foams with pore size gradients can be provided where different sized particulates will be trapped at different regions of the foams. The metal and coated metal foams can also act as catalysts or substrates for absorption or adsorption for separation of target particulates and gases from an effluent or gas stream. The foams may be charged with a voltage to function as an ionization grid to transfer charge to charge neutral particulates to facilitate collection.

20 Claims, 1 Drawing Sheet

Related U.S. Application Data

(60) Provisional application No. 62/482,594, filed on Apr. 6, 2017.

(51) Int. Cl.
 B01D 46/24 (2006.01)
 B01D 46/60 (2022.01)

(52) U.S. Cl.
 CPC ............. *B01D 2239/0478* (2013.01); *B01D 2239/1216* (2013.01)

(58) Field of Classification Search
 USPC ........................................................ 55/525
 See application file for complete search history.

(56) References Cited

U.S. PATENT DOCUMENTS

| | | | |
|---|---|---|---|
| 6,080,219 A | 6/2000 | Jha | |
| 6,284,201 B1* | 9/2001 | Buck | F01N 3/0217 422/177 |
| 7,935,163 B2 | 5/2011 | Samaras | |
| 2003/0110946 A1* | 6/2003 | Lehman | B01D 53/0407 55/385.2 |
| 2004/0129140 A1* | 7/2004 | Park | B03C 3/155 96/66 |
| 2007/0028767 A1* | 2/2007 | Choi | B01D 39/2065 55/528 |
| 2008/0028936 A1* | 2/2008 | Takahashi | F24F 8/10 96/25 |
| 2008/0217807 A1* | 9/2008 | Lee | B01D 39/1623 156/227 |
| 2009/0143227 A1* | 6/2009 | Dubrow | D06M 11/46 502/406 |
| 2010/0050866 A1* | 3/2010 | Yu | B01J 20/0233 427/256 |
| 2014/0260990 A1* | 9/2014 | Kwok | B01D 46/0036 96/135 |
| 2015/0068974 A1* | 3/2015 | Kong | B01D 53/1487 95/143 |
| 2018/0311737 A1 | 11/2018 | Burks | |
| 2019/0010627 A1 | 1/2019 | Zhan | |
| 2019/0085478 A1 | 3/2019 | Burks | |
| 2020/0086257 A1 | 3/2020 | Liu | |
| 2020/0377973 A1 | 12/2020 | Okuno | |

FOREIGN PATENT DOCUMENTS

| | | |
|---|---|---|
| CN | 102179246 B * | 12/2012 |
| WO | 20160006943 A1 | 1/2016 |
| WO | 2018187633 A2 | 10/2018 |
| WO | WO2019163256 | 8/2019 |

OTHER PUBLICATIONS

Tang, Yue et al., "Ultralow-density copper nanowire aerogel monoliths with tunable mechanical and electrical properties", J. Mater. Chem. A, 2013, 1, 6723-6726, published online Apr. 26, 2013.

Final Office Action issued in corresponding matter U.S. Appl. No. 17/244,796 on Nov. 16, 2023; 12 pages.

The non-final Office Action issued by the U.S. Patent Office on Jun. 10, 2024 for corresponding U.S. Appl. No. 17/244,796; 27 pages.

\* cited by examiner

NANOPOROUS METAL FOAM GAS AND FLUID FILTERS

CROSS-REFERENCE TO RELATED APPLICATIONS

This application claims priority to, and is a 35 U.S.C. § 111(a) continuation of, PCT international application number PCT/US2018/026343 filed on Apr. 5, 2018, incorporated herein by reference in its entirety, which claims priority to, and the benefit of, U.S. provisional patent application Ser. No. 62/482,594 filed on Apr. 6, 2017, incorporated herein by reference in its entirety. Priority is claimed to each of the foregoing applications.

The above-referenced PCT international application was published as PCT International Publication No. WO 2018/187633 on Oct. 11, 2018 and republished on Dec. 6, 2018, which publications are incorporated herein by reference in their entireties.

STATEMENT REGARDING FEDERALLY SPONSORED RESEARCH OR DEVELOPMENT

This invention was made with Government support under DE-AC52-07NA27344, awarded by the US Department of Energy (DOE). The Government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

INCORPORATION-BY-REFERENCE OF COMPUTER PROGRAM APPENDIX

Not Applicable

BACKGROUND

1. Technical Field

The technology of this disclosure pertains generally to gas filtration and pollutant arrester systems, and more particularly to devices and methods for nanoporous metal foam air and gas filters that are capable of efficiently filtering sub-0.3 micron sized particulates as well as gases through trapping, adsorption and catalytic reaction functions.

2. Background Discussion

Attempts to regulate particulate matter emissions in urban areas date back to the formation of sizable urban areas in the early stages of the industrial revolution. Even then, the relationship between particulate matter emissions and possible health effects, crop and vegetation damage and building discoloration and corrosion was apparent. Since that time, particulate matter emissions have been identified as causal factors in many health conditions, such as lung disease and related illnesses in humans, and in observed injuries to the environment.

Particulate matter (PM) is typically a complex mixture of micron sized organic or inorganic particles and liquid droplets that are classified according to size. Particles may include dusts, organic carbon compounds, salts in the form of nitrates, carbonates, chlorides, sulphates etc., oxides, heavy metals, and black carbon etc.

Serious health effects observed with exposure to particulate matter will also depend on the specific size, morphology and chemical composition of the particles. Because particles that are larger than 10 µm are effectively filtered out by the nose and upper respiratory tract, most air quality standards measure particles equal to or smaller than 10 µm. Particles with diameters that are between 2.5 µm ($PM_{2.5}$) and 10 µm ($PM1_{10}$) are called coarse particles. Particles of less than 2.5 µm in diameter are called fine particles and particles of less than 0.3 µm ($PM_{0.3}$) are called ultra-fine particles.

Deleterious health effects associated with $PM_{2.5}$ and $PM_{0.3}$ particle exposures are believed to arise from both the small particle size and the particle composition. Fine and ultra-fine particles can be inhaled deeply into the respiratory system where they can trigger inflammation and a range of short and long-term symptoms and particles may even enter the circulatory system. Some groups of people are particularly sensitive to particulate pollution such as individuals with heart or respiratory diseases. Short-term exposures to particulate pollution can aggravate lung diseases such as asthma and bronchitis, and may also increase susceptibility to respiratory infections. Long-term exposures may result in reduced lung function, chronic bronchitis, and lung cancer.

Fine particles may also remain suspended in the atmosphere and can travel long distances polluting ground and surface waters and may in some cases contribute to climate change. Persisting particle distributions in the atmosphere allow sources of particle pollution to combine in distant locations multiplying the effects.

Fine particles can be a significant fraction of particulate matter emissions from many sources globally. Over 90% of all particulates such as those found in smog are in the sub 0.3-micron regime, which pose the greatest health risks. While a key part of the solution rests in reducing emissions and suppressing pollutants at the source. Equally important is the development of materials that can effectively capture fine and ultra-fine particles.

Strong public demand for particulate matter control has stimulated the development of several emission control technologies. For example, fabric filters, electrostatic precipitators, Venturi scrubbers and many other approaches have been developed for particulate matter control.

The size and chemical composition of the particles also determines the removal strategies and techniques that may be available. However, fine and ultra-fine particles can be relatively hard to collect from an emission stream. There are few effective filters for such small particles.

Conventional air filters, such as high-efficiency particulate arrestance (HEPA) filters, are designed to capture large particulates, such as pollen and dust particles, that are over 0.3 microns in size. Current filter media with HEPA ratings, however, have such a high pressure drop that air flows are quickly reduced, limiting their ability to clean gases or air in even modest sized rooms.

Accordingly, there is a need for devices and collection schemes for the effective removal or reduction of fine and ultra-fine particles from gas flows or emission streams.

BRIEF SUMMARY

This apparatus and methods for removing fine and ultrafine particles from a gas stream of the present technology are centered generally on configurations of nanoporous metal foams and coated metal foams. Such foams have several exploitable electrical, magnetic, mechanical, optical and chemical properties due to their extremely high surface areas, nanoscale constricted geometries, and high porosity.

Nanoporous metal foams offer a platform for sub-0.3 micron particle collection by combining: 1) physical processes such as trapping and electrostatics/ionization to capture particulates; 2) absorption of certain gases into the metal foam; and 3) catalytic reactions to neutralize toxic smog species by using the metal foams as catalysts, for example.

The preferred system processes a gas or emission stream containing sub-0.3 micron particles with an optional pre-treatment module, a metal foam module, a coated foam module and an optional post-processing module. The system can be configured with modules with characteristics directed to the removal of specific types of known particulates from an emission source or generalized for air purifications, for example.

The pre-treatment module is designed to remove larger sized solids, aggregates or liquids from the gas or emission stream and may use conventional scrubbers, filters and other collectors. The apparatus can be configured for use with the exhaust stream of existing systems to eliminate particles or independently to remove particles from the atmosphere. Many existing systems are not able to remove fine and ultrafine particles that may be released to the atmosphere.

The gas stream emerging from the pre-treatment module preferably have solid or liquid particulates that are larger than approximately 2.5 μm and preferably larger than 1.0 μm removed by the module.

The metal foam module preferably uses one or more metal foams with controlled dimensions, density, composition, pore size distributions, and mechanical properties. The metal foam can be a single density, or have two sections with two densities, or have multiple discrete densities.

In one embodiment, the metal foams have a continuously varying foam density producing a pore size gradient so that particles of different sizes collect in different regions of the metal foam. Several foams of different densities can also be aligned sequentially to capture particles of different sizes according to the pore sizes.

In another embodiment, foams of the same or different metals with different characteristics are paired. The conductive metal foams may also have a voltage applied in a further embodiment.

The second foam module is preferably a coated metal foam or series of foams. Coatings of foam pores and surfaces can be selected based on chemical or electrical characteristics. For example, coatings may include carbon, a metal oxide or a specific catalytic material.

Finally, the post processing module may include changes in temperature, pressure or condensation of any remaining materials in the fluid flow as well as the collection of desirable gases or vapors.

Although a metal foam module and a coated metal foam module are shown in tandem to illustrate the system, systems with single modules of either metal foams or coated metal foams or multiple foams of different metals or coatings can be configured.

The system can also be configured to take advantage of several different particle trapping and chemical reaction mechanisms in concert and sequentially to collect the very small particles. For example, electrostatics and ionization effects can be exploited to attract small particles. In one embodiment, a metal foam is electrified and used as an ionization grid while a second foam coated with carbon or metal oxide is used to trap charged particles. The charged particles from the foam may alternatively be collected using a conventional charged plate etc. Adsorption and desorption of offensive gases by the large surface areas of the metal and coated metal foams is another available pollutant arresting mechanism.

Chemical or catalytic mechanisms are also available for emission neutralization. Both metal foams and coated or oxide foams may provide different catalytic or chemical activity. Metal foam coatings can be selected for specific activity toward target gases such as catalysts for gas chemisorption or physisorption. Current technologies in the art usually only use one type of physical or chemical mechanism to capture or neutralize certain species of particulates in emissions. The present technology combines several mechanisms to achieve the air cleaning goal, including physical processes such as trapping and ionization and electrostatics to capture particulates, absorption of certain offensive gas into the metal foam, and catalytic reactions to neutralize toxic smog species by using the metal foams as catalysts. As a result, the foams perform far better than currently existing technology.

According to one aspect of the technology, a gas or emission filtering system is provided utilizing metal foams that combine ultralight weight with a multitude of functionalities such as durability, renewability, tunability, reactivity and vast surface areas. They offer a completely new approach to combat the air pollution problem, in that the material properties can be tailored to achieve "smart" air filters.

Another aspect of the technology is to provide cost-effective, mass-producible, portable, durable and renewable devices that can provide personal protection, such as household air-filters and respirators that work in the sub 0.3-micron regime, wearable "catalytic clothing", etc.

A further aspect of the technology is to provide an advanced method of treating and capturing contaminants such as smog that includes trapping, absorption and catalytic reactions that is cost effective, renewable and durable.

Another aspect of the technology is to provide a system and methods that can be tailored and adapted to collect particulates of specific sizes and chemical compositions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, embodiments of systems and methods for fine and ultrafine particle separations from gas streams using low-density interconnected metal foams are generally shown. Several embodiments of the technology are described generally in FIG. 1 through FIG. 2 to illustrate the separation system and methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
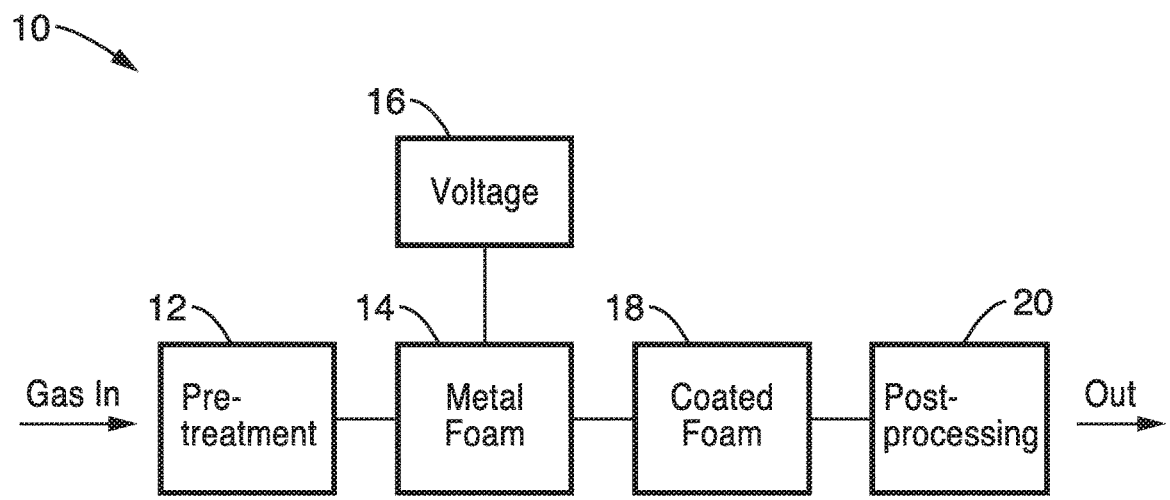
FIG. 1 is a schematic system diagram of a particulate separator with pre-treatment, metal foam, coated foam and post processing modules according to one embodiment of the technology.

Turning now to FIG. 1, one embodiment of a particle separation system 10 is shown schematically to illustrate the adaptability of the system to different particle separations from a wide variety of gas or emission sources. In the embodiment shown in FIG. 1, the processing system 10 is illustrated in a series of processing modules that may be individually configured to process specific gases or emissions and removal of specific types and sizes of particles. The modules can also be configured to provide different physical, chemical and electrostatic mechanisms to selectively remove particulates and other contaminants from a variety of sources.

In the embodiment illustrated of FIG. 1, the separation process generally begins with the introduction of a contaminated gas or emission to a pre-treatment module 12. The primary purpose of the pre-treatment module 12 is to remove large particles from the input stream that could foul the smaller particle separators and to prepare the input stream for fine and ultrafine particle separations in subsequent modules. However, in some settings, the particles in the gas or emission source are in the sub 0.3 µm size range. In these settings the pre-treatment processing of the source stream may be optional.

The pre-treatment module 12 can incorporate many existing large particle removal devices and schemes in the art such as scrubbers, fabric separators, HEPA filters and the like to remove larger particles and droplets and reduce the particle sizes in the input stream to fine and ultrafine particles.

Many existing emission treatment systems are not capable of fine particle removals and they are limited to larger particle removals. The subsequent modules of FIG. 1 can be integrated into existing emission treatment systems to improve the capacity of those systems.

The pre-treatment module 12, may also prepare the input stream from the source or large particle removal devices to be processed by the next module. For example, the module 12 can provide control over the temperature, pressure and humidity of the stream that is introduced to the metal foam module 14 for removal or reduction of the remaining particulates.

The metal foam module 14 is preferably made with one or more metal foams contained in a single or an array of housings with gas inputs and outputs that allow gas to flow through the housing and metal foams. The metal foams are preferably low cost, low density metal foams, with tunable densities between approximately 50% and approximately 0.01% by volume of the bulk density.

Several fabrication schemes are available for the production including sol-gel methods, selective dealloying of a binary alloy which involves selectively etching a less-noble metal from a bimetallic alloy and combustion synthesis such as the thermal decomposition of transition-metal complexes containing high nitrogen energetic ligands.

One particularly preferred method of metal foam fabrication is with the use of interconnected metallic ultrafine wires. The term ultrafine wire is used in a general sense for a nanoscale or micro-scale element and is intended to include a variety of structures such as tubes, rods, wires, ribbons, and fibers, etc., that have dimensions on the nanometer to micron-scale and are either solid or hollow. The metal wires are preferably made from pure metals such as Al, Ti, V, Cr, Fe, Co, Ni, Cu, Zn, Ga, Y, Zr, Nb, Mo, Ru, Rh, Pd, Ag, Sn, Sb, La, Nd, Sm, Dy, Pt, Au, Pb, and Bi, and alloys based on one or more of these metals. Combinations of compatible metal wires can also be used to form the metal foams.

The metal wires are assembled into interconnected metallic foams that are mechanically strong. The voids or porous "pockets" inside the foam are adjustable, both in size and density, by tuning the synthesis conditions. The typical "pocket" size varies from nanometer scale to microns, ideally suited to trap the most harmful <0.3 µm sized particulates.

In one embodiment, the metal foams are formed by forming a dispersion of selected metal nanowires in a liquid. The nanowire dispersion is then placed in a form and frozen. The frozen molded forms are then placed into a vacuum chamber and the frozen liquid sublimates under controlled conditions leaving a structure of interlocked nanowires. The loosely interlocked nanowire structure is sintered to bond the points of contact between the nanowires to form the final foam without significant increase in density.

The concentration or density of the nanowires within the dispersion and the nanowire dimensions can be controlled to tune the density of the final foam. The dispersion may be prepared with the density of nanoscale metal wires tuned to a given application over a continuous range from 0.01% to 50% by volume.

The tunability of the pore size and density as well as other aspects of the metal foams permits the collection of particles of predictable sizes by the foams. For example, metal foams with a pore size gradient can be achieved by continuously varying the foam density, so that particulates with different sizes will be trapped at different regions.

Figure 2:
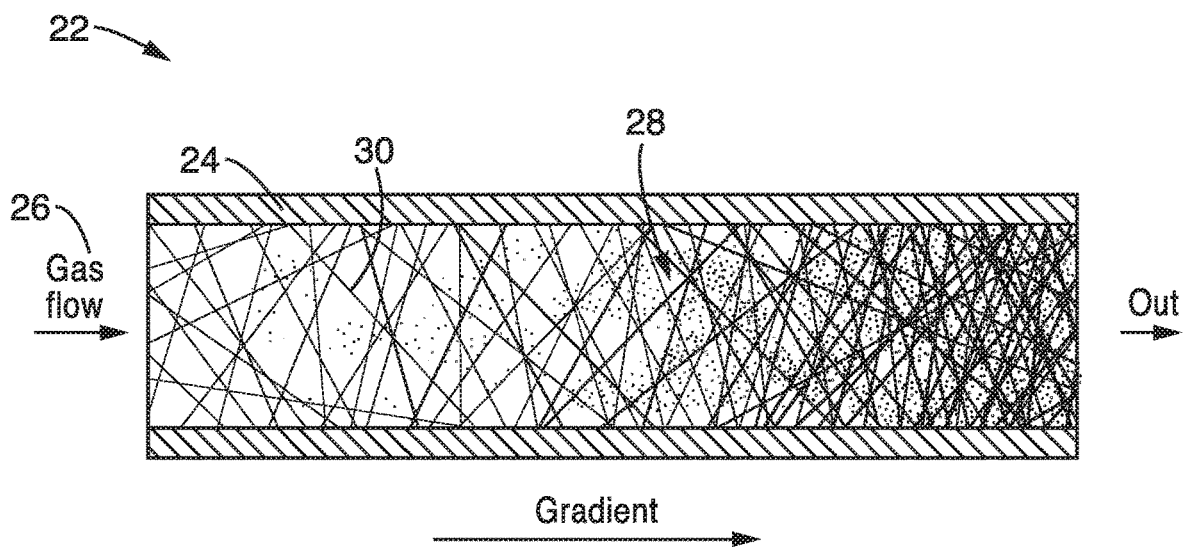
FIG. 2 is a schematic cross-sectional view of a gradient metal foam separator according to one embodiment of the technology.

Referring also to FIG. 2, a separator 22 with a metal foam disposed in a housing 24 is shown schematically in cross-section. The metal foams of increasing densities of nanowires 30 and decreasing pore 28 sizes forms a gradient. The particulates in the flow 26 of gas or emissions through the housing 24 will encounter smaller pores along the length of the housing 24 to the output in this embodiment.

In some embodiments, the metal foams of module 14 can be electrified with a controlled voltage from a voltage source 16. Charged metal foams can be used to produce electrostatic or ionization effects to trap vary small particulates and gases.

The coated foam module 18 shown in FIG. 1 receives the output of the metal foam module 14. The coated foams of the module 18 are preferably coated with at least one metal oxide or a form of carbon. The metal oxide coating of the foam can be selected for their catalytic activity or characteristics of a specific target. The oxides can be coated onto metal foams, for example using electroless deposition or atomic layer deposition. Such metal foams can trigger chemical reactions and neutralize smog into harmless gases. Since the catalysts just facilitate the chemical reactions, they are not spent themselves, thus the foams remain intact.

Although oxide coatings are discussed here, other coatings such as nitrides, chlorides, hydrides, fluorides, iodides and amines etc. may also be used to coat a foam in module 18. Such coatings may be selected by the reactivity of the coatings with constituents of the gas or emission flow. In addition, several different coated foams can be used in module 18 to produce a variety of different functionalities.

The output from the coated foam module 18 is optionally received by a post-processing module 20 in the embodiment of FIG. 1. Post processing may include separating desirable gases in the filtered gas or emission stream from undesirable gases. Collected undesirable gases such as CO, $CO_2$, $H_2S$, and $SO_2$ and others may be captured or processed further. Post processing at module 20 may also include the use of condensers, scrubbers as well as change in pressure and temperature to treat or separate remaining components from the stream.

In addition to the physical mechanisms for trapping fine and ultrafine particles provided by the processing modules of FIG. 1, the system can also be configured to exploit electrostatic, ionization and chemical mechanisms.

Electrostatic interactions have been commonly used to attract very small particulates. These interactions can be enhanced with the charged foams. For example, air ion emissions can transfer charges to an originally charge-neutral particle giving the particle an overall charge and thus enhance the electrostatic effect. A similar principle has been incorporated in many commercial air purification systems.

The conductive nature of the metal foams of module 14 and the voltage source 16 provides an additional handle to take advantage of this effect. In the embodiment shown in FIG. 1, two metal foams can be used in tandem. The charged first metal foam of module 14 can be used as an ionization grid. The second metal foam of module 18 is coated with a thin layer of carbon or $TiO_2$ that can and act as a supercapacitor to attract and trap charged particulates to the coated foam.

Other mechanisms that can be utilized are absorption and adsorption of offensive gases by the metal and/or coated metal foams. The low-density foams have a very large surface area that can provide another effective pollutant arresting mechanism by absorption or adsorption. The absorption/adsorption effectively takes the offensive gases out of the environment.

The trapped gas can be released through the desorption process into a controlled exhaust under suitable temperatures and pressures. The cycle can repeat itself, providing renewability of the foams. This feature may be applicable to primary smog gases, such as nitrogen oxides, carbon oxides, sulfur oxides, ammonia and ozone.

Chemical mechanisms may also be used for contaminant neutralization. The large surface/volume ratio in the metal foams and coated metal foams may drastically enhance the catalytic activity in comparison with bulk materials, leading to a much higher chemical reactivity.

A variety of metal foams, such as Cu, Ni, Pd, Pt, Au, Ag, Pb, Sn, Ti, Fe, Co, Nb, Mo, Ta, W, Al are good catalysts, which can trigger NO reduction, CO methanation or oxidation, ethylene hydrogenation, methane combustion or reaction with NO, methanol synthesis, etc.

Certain solid metal oxide semiconductors such as $TiO_2$, ZnO, $V_2O_5$, $MoO_3$, $SiO_2$, and $Ni_xCr_{1-x}Mo_xP_{1-x}O_4$ are excellent photocatalysts. They can be excited by light with energy higher than the band gap, leading to electron-hole pairs that participate in a surface reaction, to trigger photodegradation of toxic contaminants. The oxides can be coated onto metal foams using a variety of methods such as electroless deposition or atomic layer deposition. Such metal foams can trigger chemical reactions and neutralize smog into harmless gases. Since the catalysts just facilitate the chemical reactions, they are not spent themselves, thus the foams remain intact.

Other metal oxide for foam coatings can be selected based on the adsorption capacity, sensitivity and selectivity for target gases for removal from the effluent or gas stream. For example, MgO and CaO have been shown to destructively adsorb organophosphorus compounds. $NH_3$, $SO_2$ and $CO_2$ and other gases can be adsorbed on to metal oxides such as ZnO, $WO_3$, $SnO_2$, CaO, MgO, $Fe_2O_3$, $TiO_2$, $ZrO_2$, $Li_2O$, $Li_2SO_4$ and $Al_2O_3$, for example. Mixed metal oxides can also be used as metal foam coatings such as $RuO_2$—$TiO_2$, $IrO_2$—$TiO_2$ and or $RuO_2$—$Co_3O_4$—$SnO_2$—$RuO_2$ and others shown to have desirable activity. Metal oxide coatings may also be doped with reactive materials in some settings. Target gases may also be desirable gases for collection such as hydrogen.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the functionality and operational principles of the particulate removing platform and methods, nanostructured palladium metal foams were fabricated and evaluated.

Polycrystalline Pd nanowires were fabricated by electrodeposition into porous templates, then harvested from the templates and suspended in water. Palladium nanowires were fabricated by electrodeposition from an aqueous solution of 6 mM $PdCl_2$+0.1 M HCl (1M=1 mol $L^{-1}$). Electrodeposition was performed at −450 mV relative to a $Ag^+$/AgCl reference electrode into Au-coated (working electrode) anodized aluminum oxide (AAO) or track-etched polycarbonate membranes.

Nanowires with diameters of (10-200) nm and lengths of (3-20) μm were produced. After deposition, the Au working electrode was selectively etched using a solution of 0.4 M $K_3Fe(CN)_6$+0.2 M KCN+0.1 M KOH.

The AAO (polycarbonate) membranes were then dissolved by sonicating them in 6 M NaOH (dichloromethane). The nanowires were transferred to distilled or deionized water using a precipitation/decanting/solvent replacement technique.

Nanowires were then freeze-cast into foam monoliths. To construct the nanowire foam, the wires were allowed to precipitate out of solution and the water level was adjusted to the nominal final volume of the foam. The settled nanowires were then sonicated to develop a randomly dispersed slurry, which was immediately immersed in liquid nitrogen, freezing the wires in a random distribution in the ice matrix.

The frozen slurry was then placed in vacuum (<0.1 Pa) for >12 h to sublimate the interstitial ice, leading to the pure Pd nanowire foam. The mechanical strength of the foam was further enhanced by sintering.

Scanning electron microscopy, and high-resolution transmission electron microscopy was performed on both the foams and individual wires. Scanning electron microscopy micrographs confirmed the highly porous structure of the fabricated foams. For Pd foams composed of 200 nm diameter, 15 μm long wires, the foam density was tunable between 12 and 135 mg cm$^{-3}$, corresponding to a density that is only 0.1-1% of bulk Pd.

This synthesis approach is scalable for industrial applications, as wet chemistry based solution synthesis is well suited for mass production of nanowires and industrial sized freeze-drying devices are readily available. In this work, we focus on an example monolith which has a density of 41±3 mg cm$^{-3}$ and surface area of 6.9±0.1 m$^2$ g(Pd)$^{-1}$ (the confidence interval represents one standard deviation, and is determined by the accuracy of the measurement tools); porosity measurements show that the foam has few constricted volumes (e.g., cavities or cracks).

Example 2

To further demonstrate the capabilities of the metal foams, the Pd metal foams were evaluated for gas storage capacity and as a catalyst. Hydrogen absorption/desorption measurements were performed using a commercially available precision gas dose controller with forked sample tube and a Calvet-type twin microcalorimeter.

Equilibrium was defined as a pressure change of <0.01% over 10 s. Thermodynamic measurements were performed using a constant temperature (37° C.), incremental dosing approach and by integrating the heat flow from the calorimeter. Rate of adsorption (ROA) measurements were also performed.

The X-ray diffraction (XRD) pattern of the Pd nanowires showed the Pd (111) and (200) peaks, identifying a cubic lattice parameter of a=3.86±0.01 Å, consistent with bulk values. After a 1 h exposure to ≈200 kPa hydrogen (at 25° C.), the peaks shifted to lower 2θ values as a increased to 4.00±0.01 Å, signaling the formation of PdH$_x$.

The hydrogen could be desorbed by heating (250° C. for 30 min in air) or vacuum (30 min, 25° C., P$_{Base}$<0.01 Pa), as indicated by the shifting XRD peaks. Translation of the peaks, rather than broadening or splitting, indicates that the hydrogen penetrates the entire wire uniformly, compared to bulk palladium in which penetration is limited by the rate of hydrogen diffusion. Interestingly, after successive hydrogen exposures, the PdH$_x$(111) peak shifted to lower angles, indicating the lattice parameter for the PdH$_x$ increases with cycling, corresponding to enhanced hydrogen absorption.

Palladium foam monoliths demonstrated excellent characteristics for hydrogen storage applications, including their hydrogen loading capacity, rate of absorption, and heat of absorption. The hydrogen absorption/desorption process is highly hysteretic, along with substantial lattice expansion/contraction as the foam converts between Pd and PdH$_x$. Such foams with pristine metal surfaces are also suitable for use as catalysts.

From the description herein, it will be appreciated that that the present disclosure encompasses multiple embodiments which include, but are not limited to, the following:

1. A metallic foam structure for air and gas purifications, comprising: an interconnected ultrafine metallic wire network, the metallic wire network having a plurality of nanometer to micron scale pores; and a coating on exterior surfaces of the metallic wire network and pores to produce a coated metallic foam.

2. The metallic foam structure of any preceding or following embodiment, wherein the coating comprises a catalytic metal oxide selected from the group consisting of TiO$_2$, ZnO, V$_2$O$_5$, MoO$_3$, SiO$_2$, and Ni$_x$Cr$_{1-x}$Mo$_x$P$_{1-x}$O$_4$.

3. The metallic foam structure of any preceding or following embodiment, wherein the coating comprises a metal oxide selected from the group consisting of WO$_3$, SnO$_2$, CaO, MgO, Fe$_2$O$_3$, ZrO$_2$, Li$_2$O and Al$_2$O$_3$.

4. The metallic foam structure of any preceding or following embodiment, wherein the coating comprises a mixed metal oxide.

5. The metallic foam structure of any preceding or following embodiment, wherein the coating comprises a layer of carbon.

6. The metallic foam structure of any preceding or following embodiment, wherein the metal nanowire network is formed from one or more metals selected from the group of metals consisting of Al, Ti, V, Cr, Fe, Co, Ni, Cu, Zn, Ga, Y, Zr, Nb, Mo, Ru, Rh, Pd, Ag, Sn, Sb, La, Nd, Sm, Dy, Pt, Au, Pb, and Bi, and alloys of one or more of these metals.

7. The metallic foam structure of any preceding or following embodiment: wherein the metallic nanowire network having a plurality of nanometer to micron scale pores forms a pore size gradient across a dimension of the coated metallic foam; and wherein particles of different sizes passing through the coated metallic foam will collect in different regions of the coated metallic foam.

8. The metallic foam structure can further comprise an uncoated interconnected ultrafine metallic wire network coupled to the coated metallic foam; the uncoated metallic wire network having a plurality of nanometer to micron scale pores to produce an uncoated metallic foam.

9. The uncoated metallic nanowire network of the metallic foam structure can be is formed from one or more metals selected from the group of metals consisting of Al, Ti, V, Cr, Fe, Co, Ni, Cu, Zn, Ga, Y, Zr, Nb, Mo, Ru, Rh, Pd, Ag, Sn, Sb, La, Nd, Sm, Dy, Pt, Au, Pb, and Bi, and alloys of one or more of these metals.

10. The uncoated metallic nanowire network of the metallic foam structure can have a plurality of nanometer to micron scale pores forms a pore size gradient across a dimension of the uncoated metallic foam; and wherein particles of different sizes passing through the uncoated metallic foam will collect in different regions of the uncoated metallic foam.

11. A fluid filtration system for removing particulates and contaminants from a fluid flow, comprising: a filter housing with an interior, an intake port and an output port; and at least one filter element disposed within the interior of the housing; the filter element comprising a metal foam of an interconnected ultrafine metallic wire network; the network having a plurality of nanometer to micron scale pores.

12. In the system of any preceding or following embodiment the metal foam can have a density from about 20 g/cm$^3$ to about 1 mg/cm$^3$.

13. The system of any preceding or following embodiment, the filter element further comprising: a plurality of metal foams, each foam having a different density aligned sequentially according to density and forming a density gradient within the housing.

14. The system of any preceding or following embodiment, further comprising: a voltage source electrically coupled to the metal foam.

15. The system of any preceding or following embodiment, further comprising: a second filter element coupled to the first filter element within the interior of the housing; the second filter element comprising: (i) at least one interconnected ultrafine metallic wire network, the network having a plurality of nanometer to micron scale pores; and (ii) a coating on exterior surfaces of each metallic wire network and pores to produce a coated metal foam.

16. The system of any preceding or following embodiment, further comprising: a voltage source electrically coupled to the metal foam; and a second filter element of a coated metal foam of an interconnected ultrafine metallic wire network coated with a catalytic metal oxide or carbon, the second filter element adjacent to the first filter element within the interior of the housing; wherein a voltage applied to the metal foam of the first filter element functions as an ionization grid configured to transfer charges to charge neutral particulates; and wherein the second filter element coated foam layer traps charged particles within the pores of the coated foam.

17. The system of any preceding or following embodiment, further comprising: a pre-filter coupled the intake port of the filter housing, the pre-filter configured to remove particulates larger than about 2.5 microns from a fluid flow.

18. A method for removing particulates and contaminants from a fluid flow, the method comprising: forming a nanostructured metal foam, the foam having a plurality of nanometer to micron scale pores; and flowing fluid over or through the metal foam trapping fluid borne particulates within the micron scale pores of the foam.

19. The method of any preceding or following embodiment, further comprising: controlling synthesis conditions of the metal foam formation thereby adjusting the size and density of pores within the metal foam.

20. The method of any preceding or following embodiment, further comprising: continuously varying the pore density of the formed metal foam to produce a pore size gradient; wherein different sized particulates will be trapped at different regions of the metal foam.

21. The method of any preceding or following embodiment, further comprising: coating the pores of the nanostructured metal foam with a coating selected from the group of coatings consisting of carbon, an oxide, a nitride, a chloride, a hydride, a fluoride, an iodide and an amine.

22. The method of any preceding or following embodiment: wherein the metal foam coating is a catalytic metal oxide; and wherein the catalytic metal oxide triggers chemical reactions and neutralizes contaminants.

23. The method of any preceding or following embodiment, further comprising: flowing a stream of gases containing charge neutral particulates over or through the metal foam; applying a voltage to the metal foam to transfer charge to the charge neutral particulates in the stream of gases; and collecting the charged particulates.

24. The method of any preceding or following embodiment, further comprising: forming a second nanostructured metal foam with a plurality of nanometer to micron scale pores, the second nanostructured metal foam coated with a catalytic metal oxide; and collecting the charged particulates in the pores of the second nanostructured metal foam.

25. The method of any preceding or following embodiment, further comprising: forming a second nanostructured metal foam with a plurality of nanometer to micron scale pores, the second nanostructured metal foam coated with a catalytic metal oxide; flowing contaminated gases through the first and second metal foams; adsorbing contaminants from the flow of contaminated gases within the pores of the two metal foams; and desorbing contaminants from the two foams by exposing the foams to a change in temperature and pressure.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A filtration system comprising:
a filter housing defining an interior, wherein the filter housing includes an intake port and an output port;

a first filter element disposed within the interior of the filter housing between the intake port and the output port, wherein:
  said first filter element comprises a freeze-cast, polycrystalline metal foam comprising of a three-dimensional interconnected ultrafine metallic wire network having interconnections of interconnected ultrafine metallic wires consisting of a non-metal-oxide metal, and wherein the metal foam is formed from a process that comprises:
    a formation step consisting of forming a dispersion of the metallic nanowires in a liquid,
    a placement step that consists of placing the dispersion in a form and freezing the dispersion,
    a sublimation step consisting of leaving a structure of interlocked nanowires,
    a bonding step consisting of bonding points of contact between the nanowires,
  the interconnected ultrafine metallic wire network comprises a plurality of nanometer to micron scale pores defined by gaps between the interconnected ultrafine metallic wires,
  the interconnected ultrafine metallic wire network is configured to capture at least some of a plurality of neutral particulates in a flow as the flow passes through the first filter element, and
  the interconnected ultrafine metallic wires have dimensions in the nanometer to micron scale;
a voltage source electrically coupled to the first filter element that is operable to apply a voltage to the first filter element so that the first filter element functions as an ionization grid capable of charging at least some of the plurality of neutral particulates in the flow as the flow passes through the first filter element, resulting in the plurality of neutral particulates becoming a plurality of charged particulates; and a second filter element disposed within the interior of the filter housing that is downstream from the first filter element through which the flow passes, wherein:

the flow comprises the plurality of charged particulates, the second filter element comprises a coated metal foam that is capable of trapping at least some of the plurality of charged particulates within the coated metal foam, and the coated metal foam comprises an interconnected ultrafine metallic wire network coated with a catalytic metal oxide or carbon.

2. The filtration system of claim 1, said first filter element further comprising:

one or more additional freeze-cast, polycrystalline metal foams, each additional freeze-cast, polycrystalline metal foam having a different density aligned sequentially according to density and forming a density gradient within the filter housing.

3. The filtration system of claim 1, further comprising:

a pre-filter coupled to the intake port of the filter housing, wherein the pre-filter is configured to remove particulates in the flow that are larger than about 2.5 microns from the flow.

4. The filtration system of claim 1 wherein:

said interconnections of the interconnected ultrafine metallic wire network of the first filter are bonded via sintering.

5. The filtration system of claim 1, wherein:

said interconnections of the interconnected ultrafine metallic wire network of the first filter are bonded via coating.

6. The filtration system of claim 1, wherein said interconnected ultrafine metallic wire network of the first filter element has a coating on exterior surfaces, thereby making the freeze-cast, polycrystalline metal foam a coated, freeze-cast, polycrystalline metal foam.

7. The filtration system of claim 6, wherein said coating comprises a catalytic metal oxide selected from the group consisting of $TiO_2$, ZnO, $V_2O_5$, $MoO_3$, $SiO_2$, and $Ni_xCr_{1-x}Mo_xP_{1-x}O_4$.

8. The filtration system of claim 6, wherein said coating comprises a metal oxide selected from the group consisting of $WO_3$, $SnO_2$, CaO, MgO, $Fe_2O_3$, $ZrO_2$, $Li_2O$ and $Al_2O_3$.

9. The filtration system of claim 6, wherein said coating comprises at least one of:

a mixed metal oxide; and carbon.

10. The filtration system of claim 6, wherein:

the plurality of nanometer to micron scale pores of said interconnected ultrafine metallic wire network form a pore size gradient across a dimension of the coated metal foam; and particulates of different sizes passing through the coated, freeze-cast, polycrystalline metal foam are collected in different regions of the coated, freeze-cast, polycrystalline metal foam when the flow flows over or through the coated, freeze-cast, polycrystalline metal foam.

11. The filtration system of claim 6, wherein:

said coating comprises a catalytic metal oxide; and said catalytic metal oxide triggers chemical reactions and neutralizes the contaminants within the flow flowing over or through the coated, freeze-cast, polycrystalline metal foam.

12. The filtration system of claim 1, wherein the flow being filtered is air or a gas.

13. A filtration system comprising:

a housing;

a first filter element and a second filter element disposed within an interior of the housing, wherein:

the second filter element is downstream from the first filter element, the first filter element comprises a freeze-cast, polycrystalline metal foam comprising of an interconnected three-dimensional gel ultrafine metallic wire mesh comprising interconnected ultrafine metallic wires that consist of a non-metal-oxide metal, wherein the mesh was formed through a process comprising:

a formation step consisting of forming a dispersion of the metallic nanowires in a liquid, a placement step that consists of placing the dispersion in a form and freezing the dispersion, a sublimation step consisting of leaving a structure of interlocked nanowires, a bonding step consisting of bonding points of contact between the nanowires, the interconnected three-dimensional ultrafine metallic wire mesh comprises a plurality of nanometer to micron scale pores defined by gaps between the interconnected ultrafine metallic wires, and the interconnected three-dimensional ultrafine metallic wire mesh is capable of capturing at least some of a plurality of particulates in the flow after the flow passes through the first filter element, and the interconnected ultrafine metallic wires have dimensions in the nanometer to micron scale;

a voltage source electrically coupled to the first filter element that is operable to apply a voltage to the first filter element so that the first filter element functions as an ionization grid capable of charging at least some of the plurality of particulates that are neutral particulates in the flow as the flow passes through the first filter element, resulting in the plurality of neutral particulates becoming a plurality of charged particulates; and a second filter element disposed within the interior of the housing that is downstream from the first filter element through which the flow passes, wherein:

the flow comprises the plurality of charged particulates, the second filter element comprises a coated metal foam that is operable to trap at least some of the plurality of charged particulates within the pores of the coated metal foam, and the coated metal foam comprises an interconnected ultrafine metallic wire network coated with a catalytic metal oxide or carbon.

14. The first filter element of claim 13, further comprising: one or more additional freeze-cast, polycrystalline metal foams, each additional freeze-cast, polycrystalline metal foam having a different density aligned sequentially according to density and forming a density gradient within the housing.

15. The first filter element of claim 13, wherein:

the plurality of nanometer to micron scale pores of said interconnected three-dimensional ultrafine metallic wire mesh of the first filter element form a pore size gradient across a dimension of the freeze-cast, polycrystalline metal foam; and particulates of different sizes passing through the freeze-cast, polycrystalline metal foam are collected in different regions of the freeze-cast, polycrystalline metal foam when the flow flows over or through the freeze-cast, polycrystalline metal foam.

16. The first filter element of claim 13, wherein said additional interconnected three-dimensional ultrafine metallic wire mesh has a coating on exterior surfaces of the ultrafine metallic wires, thereby making the freeze-cast, polycrystalline metal foam a coated freeze-cast, polycrystalline metal foam.

17. A method of removing particulates and contaminants from a flow, the method comprising:

intaking the flow via an intake port of a filter housing;

filtering the particulates and contaminants from the flow through a first filter element comprising a freeze-cast, polycrystalline metal foam that comprises of an interconnected three-dimensional ultrafine metallic wire mesh comprising interconnected ultrafine metallic wires that consist of a non-metal-oxide metal, wherein:

interconnections of interconnected ultrafine metallic wires of said interconnected ultrafine metallic wire mesh are bonded, and the interconnected ultrafine metallic wire mesh comprises a plurality of nanometer to micron scale pores defined by gaps between the interconnected ultrafine metallic wires, the interconnected ultrafine metallic wires have dimensions in the nanometer to micron scale, and the interconnected ultrafine metallic wire mesh captures at least some of the particulates and the contaminants from the flow and wherein the mesh was formed through a process comprising:

a formation step consisting of forming a dispersion of the metallic nanowires in a liquid, a placement step that consists of placing the dispersion in a form and freezing the dispersion, a sublimation step consisting of leaving a structure of interlocked nanowires, a bonding step consisting of bonding points of contact between the nanowires, applying a voltage using a voltage source coupled to the first filter element so that the first filter element functions as an ionization grid capable of charging at least some of the particulates and the contaminants that are neutral particulates in the flow as the flow passes through the first filter element, resulting in the neutral particulates becoming a plurality of charged particulates; and filtering at least some of the plurality of charged particulates in the flow using a second filter element disposed within the interior of the filter housing that is downstream from the first filter element through which the flow passes, wherein:

the second filter element comprises a coated metal foam that is operable to trap at least some of the plurality of charged particulates within the pores of the coated metal foam, and the coated metal foam comprises an interconnected ultrafine metallic wire network coated with a catalytic metal oxide or carbon.

18. The method of claim 17, further comprising:

filtering the particulates and contaminants from the flow through one or more additional filter elements, wherein each additional filter element comprises an additional freeze-cast, polycrystalline metal foam, each additional freeze-cast, polycrystalline metal foam having a different density aligned sequentially according to density and forming a density gradient within the filter housing.

19. The method of claim 17, wherein:

the plurality of nanometer to micron scale pores of said interconnected three-dimensional ultrafine metallic wire mesh form a pore size gradient across a dimension of the freeze-cast, polycrystalline metal foam and particulates of different sizes passing through the freeze-cast, polycrystalline metal foam are collected in different regions of the freeze-cast, polycrystalline metal foam when the flow flows over or through the freeze-cast, polycrystalline metal foam.

20. The method of claim 17, wherein said interconnected ultrafine metallic wire mesh of the first filter element has a coating on exterior surfaces of the ultrafine metallic wires, thereby making the freeze-cast, polycrystalline metal foam a coated freeze-cast, polycrystalline metal foam.

* * * * *